(12) United States Patent
Kilday (10) Patent No.: US 7,988,161 B2
(45) Date of Patent: Aug. 2, 2011

(54) PIANO DOLLY

(75) Inventor: Gary R. Kilday, Cincinnati, OH (US)

(73) Assignee: GRK Manufacturing Co., Hamilton, OH (US)

( * ) Notice: Subject to any disclaimer, the term of this patent is extended or adjusted under 35 U.S.C. 154(b) by 382 days.

(21) Appl. No.: 12/353,448

(22) Filed: Jan. 14, 2009

(65) Prior Publication Data

US 2010/0176568 A1 Jul. 15, 2010

(51) Int. Cl.
*B62B 3/12* (2006.01)
*B62B 3/02* (2006.01)

(52) U.S. Cl. ............... 280/79.11; 280/638; 280/35

(58) Field of Classification Search ........... 280/79.11, 280/79.2, 79.7, 35, 42, 638, 640, 651
See application file for complete search history.

(56) References Cited

U.S. PATENT DOCUMENTS

| | | | |
|---|---|---|---|
| 0,009,283 A | 9/1852 | Woodruff | |
| 0,442,825 A | 12/1890 | Randall | |
| 444,020 A * | 1/1891 | Rogers et al. | 280/35 |
| 0,525,298 A | 8/1894 | Thiele et al. | |
| 0,649,300 A | 5/1900 | Hall et al. | |
| 975,941 A * | 11/1910 | Fiset | 248/129 |
| 1,283,166 A | 10/1918 | Harper | |
| 1,322,719 A | 11/1919 | Nelson | |
| 1,350,963 A * | 8/1920 | Fowler | 248/172 |
| 1,853,318 A * | 4/1932 | Peters | 280/35 |
| 1,887,067 A | 11/1932 | Pehrsson | |
| 2,613,083 A | 10/1952 | Moludy | |
| 2,878,028 A | 3/1959 | Long | |
| 3,288,479 A * | 11/1966 | Ullman | 280/35 |
| 3,507,402 A | 4/1970 | Barbee | |
| 3,710,670 A | 1/1973 | Winkler | |
| 4,166,638 A | 9/1979 | De Prado | |
| 4,471,971 A | 9/1984 | Keesler | |
| 4,475,714 A | 10/1984 | Heiskell et al. | |
| 4,572,531 A * | 2/1986 | Elia | 280/62 |
| 4,969,657 A | 11/1990 | Kaufmann | |
| 5,711,227 A * | 1/1998 | Johnson | 104/126 |
| 5,726,368 A | 3/1998 | Shaw | |
| 7,213,820 B2 | 5/2007 | Drummond | |
| 7,287,766 B2 | 10/2007 | Kilday et al. | |

FOREIGN PATENT DOCUMENTS

JP 9-81120 3/1997

OTHER PUBLICATIONS

GRK Manufacturing Company, Quality Craftsmanship, brochure, circa 1999, cover page, pp. 11 and 14, and rear page.
Piano Showcase, #4—Dollies, Grand Piano Trucks and Moving Equipment, Internet website pages, exact date of posting on Internet not known by applicant, but posted at least as early as Jul. 5, 2005, six pages total.

* cited by examiner

*Primary Examiner* — Hau V Phan
*Assistant Examiner* — Vaughn T Coolman
(74) *Attorney, Agent, or Firm* — Wood, Herron & Evans, LLP (57) ABSTRACT

A dolly on which a grand piano can be mounted to facilitate movement thereof over a surface from one location to another, which includes a central hub shaped in the form of a miniature grand piano, two fixed length arms of equal length pivotally connected to the front of the hub at opposite corners thereof, and a fixed length rear arm having a longitudinal slot which is pivotally connected to the rear of the hub at selectively adjustable positions along the length of the slot to accommodate grand pianos having a range of different lengths.

11 Claims, 10 Drawing Sheets

PIANO DOLLY

FIELD OF THE INVENTION

The present invention relates to a dolly, and more particularly, to a dolly for moving a grand piano from one location to another.

BACKGROUND OF THE INVENTION

Piano dollies are well known in the art for moving grand pianos to and from the place of use, such as the stage of an auditorium, opera house or the like. Known dollies include those having three arms which can be used to support and move grand pianos. Dollies of this type, which are sometimes referred to as "spider dollies", typically have a central hub formed from two vertically spaced plates, and three arms extending radially outwardly from between the plates. Each arm is pivotally mounted at its inner end to the central hub so that each arm may be rotated relative to the hub to accommodate grand pianos of different shapes and/or lengths. To provide the necessary adjustability for accommodating differently configured piano lengths and leg arrangements, each of the three arms of known grand piano spider dollies are adjustable in length, such as by incorporating a pair of coaxial arm sections which telescope one within the other.

The distal ends of the arms of many known grand piano spider dollies typically terminate in a Z-shaped member when viewed in side elevation, with the inner arm portion thereof being higher than the outer arm portion. A relatively large swiveling-type caster is mounted under the high, horizontally extending inner arm portion of each Z-shaped member, while the lower, horizontally extending outer arm portion of each Z-shaped member carries a receptacle for accepting a caster mounted to the lower end of one of the piano legs. In this manner, it is only necessary to lift the piano a relatively small vertical distance to position it on the dolly, but the dolly can still utilize relatively large casters to facilitate moving heavy pianos. A prior art grand piano dolly of the foregoing type is described in U.S. Pat. No. 1,887,067.

While spider dollies for moving grand pianos have been advantageously used for many years, they are subject to some disadvantages. For example, the design of a typical grand piano spider dolly does not lend itself to pre-assembly before shipping. Instead, the spider dolly is usually assembled at the location of use so that the central hub can be positioned under the piano, followed by rotation of each arm relative to the hub and adjustment of the length of each arm to accommodate the size and shape of the particular piano. These multiple angular and length adjustments are difficult to make in advance.

Further, known grand piano spider dollies, if preassembled prior to shipping, lack compactness and, thus result in increased cartoning and shipping costs.

Grand pianos typically have a pedal lyre that extends below the main body of the piano toward, but with its lower end spaced slightly above, the floor the piano rests on, in addition to the three support legs. For smaller grand pianos of this type, the location of the pedal lyre can preclude the use of a spider dolly due to mechanical interference between the lyre and the central hub of the dolly.

Another disadvantage of grand piano spider dollies is that virtually the entire dolly is in clear view when the piano is mounted on it. This is sometimes considered to be unsightly and can detract from the aesthetic beauty of the piano. This can be particularly problematic in some circumstances. For instance, if a grand piano will be used for one or more acts of an opera or play, but not throughout the entire performance, the piano may remain mounted on the dolly during the performance so it can be quickly removed from the stage between acts. In instances such as this, the unattractive visual appearance of known spider dollies is undesirable.

In addition, the requirement of existing grand piano spider dollies that each arm be independently adjustable in length results in extra components, such as sleeves, multiple telescoping arm sections, extra fasteners, and the like, which add weight and complexity, and increases the set-up time required to match a dolly to a particular grand piano leg configuration. Additionally, it increases the number of different parts which the manufacturer must carry in inventory to accommodate the necessary number of different models and styles needed for use with pianos having lengths and leg configurations which vary over a wide range. All of the foregoing increases the manufacturer's overall cost of manufacturing, cartoning and shipping a full line of piano dollies.

In view of the foregoing, there is a continuing need for an improved dolly for moving grand pianos of different lengths and leg configurations, which can be factory assembled and compactly configured for shipment, yet minimizes the number of different components required to accommodate a wide range of piano lengths and leg configurations.

SUMMARY OF THE INVENTION

Accordingly, the present invention is directed to a grand piano dolly comprising a central hub from which extend three arms. Each of the arms is of fixed length, provided with a receptacle located at its outer end for receiving the lower end of a different one of the three downwardly extending legs of the piano, and has a roller assembly extending below a portion of the arm to permit the dolly and grand piano mounted thereon to be moved on a surface such as the floor of a stage. The first and second fixed length arms are pivotally connected at first and second fixed pivot locations thereon, respectively, to the hub at respective first and second fixed pivot connection points on the hub. The first and second fixed length arms, in use, support different ones of the lower ends of the front pair of piano legs, which are typically located slightly horizontally outwardly of the keyboard at opposite ends thereof. The third fixed length arm is provided with a longitudinal through slot oriented along the length of the arm, with the inner and outer slot ends thereof being spaced inwardly of the inner and outer ends of the arm. The third fixed length arm is pivotally connected, at a selectively variable position along the slot, to the central hub at a third pivot connection point on the hub, which is spaced from the first and second fixed hub pivot connection points, to selectively vary the distance between the outer end of the third arm and the selectively variable position along the slot whereat the third arm is pivotally connected to the hub, to accommodate mounting grand pianos of different lengths having differing horizontal distances between the lower end of the rear piano leg and the lower end of the front piano leg closest thereto. With the foregoing construction, different length pianos can be accommodated with three arms, each of fixed length, thereby eliminating the need to provide additional components such as telescoping arms, multiple sleeves, etc. heretofore necessary with prior art grand piano dollies to allow for adjusting the lengths of the respective arms.

In one preferred embodiment of the invention, the first and second, or front, arms have the same length and otherwise are structurally identical, thereby minimizing the number of different parts which the manufacturer must inventory to accommodate different length grand pianos.

In accordance with another preferred embodiment, the third, or rear, arm has the same length as the two front arms, and is otherwise structurally identical thereto, except for incorporating a longitudinally oriented slot, further reducing the number of different length arms that must be inventoried to accommodate grand pianos of different length.

In accordance with yet another preferred embodiment, the central hub includes a flat plate which, when viewed in plan, has a peripheral shape in the form of a miniature grand piano. The front edge of the plate is straight to simulate the front straight keyboard edge of a grand piano when viewed in plan. The remaining peripheral edge of the plate, which interconnects the opposite ends of the keyboard edge, is shaped to simulate the remaining peripheral edge of a grand piano which, when viewed in plan, extends rearward from the left end of the keyboard edge, curvilinearly around the rear, and forwardly to the right end of the keyboard edge. The respective lengths of the front pair of fixed length arms, and the respective first and second fixed pivot connection points on the plate where the respective inner ends of the first and second arms are pivotally connected to the plate, are selected such that when the lower ends of the first and second piano legs are mounted on the first and second dolly arms, the front edge of the plate is substantially parallel to the front edge of the keyboard. This embodiment has the advantage of being aesthetically more attractive when a grand piano is mounted on the dolly and the dolly is in full view of the audience. In accordance with a further aspect of this preferred embodiment, the first and second front arms are of equal length and the first and second fixed pivot connection points on the hub to which the inner ends of the front arms are respectively connected are selected to be symmetrically located adjacent the left and right front corners of the grand piano shaped plate. The foregoing arrangement enables the user to instantly recognize that the first and second arms connect to the left and right front piano legs, respectively. It is also immediately apparent to the user that the remaining, third arm connects to the rear piano leg. Such occurs because the user appreciates that the orientation of the grand piano shaped hub plate should mimic the orientation of the grand piano.

For added strength and stability, the hub in accordance with the foregoing preferred embodiment, preferably includes two identical, vertically spaced, grand piano shaped plates between which the inner ends of the three arms are sandwiched and pivotally connected to the plates. The upper and lower hub plates and the three arms pivotally connected thereto are held in operative position by providing (a) aligned through holes in each of the plates at the first, second and third fixed pivot connection points on the hub, (b) through bores at the respective fixed pivot locations of the inner ends of first and second arms, and (c) three adjustable fasteners, two of which are located respectively in the bores at the inner ends of the first and second front arms and the first and second through holes of the upper and lower plates which are respectively aligned therewith, with the third fastener located in the slot in the third rear arm and the third through holes of the upper and lower plates which are aligned therewith. When the adjustable fasteners are loosened, but not removed, the angulation of each arm can be selectively adjusted, as well as the distance which the rear arm extends rearwardly beyond the hub, to conform the position of the ends of the arms to match the configuration of the three piano legs. Thereafter the adjustable fasteners are tightened urging the plates toward each other in clamping relation to the inner arm ends sandwiched there between to thereby secure the arms in the desired orientation.

A further advantage of the invention is that the entire dolly can be assembled with only three adjustable fasteners, thereby minimizing both assembly time and number of components, and can be shipped with all the arms oriented in parallel and extending from the hub in a rearward direction, with the inner and outer ends of all the arms being in line with each other thereby minimizing shipping volume and hence packaging and shipping expense.

A still further advantage of this invention is that a multiple model, grand piano product line to accommodate grand pianos varying in length over an extremely large range, such as between approximately 5-8 feet, can readily be fabricated with minimal different component part inventory requirements. This can be accomplished by using identical fixed length front arms, identical hubs, identical fasteners, and inventorying slotted fixed length rear arms in several different lengths as needed to accommodate grand pianos having lengths which vary widely. For example, it is possible to provide three different grand piano dolly models, each using the identical fixed length arms for the front pair of arms, identical hubs and fasteners, and three rear slotted fixed length arms which differ in length to accommodate grand pianos having lengths varying in three different ranges which collectively span a length range of 5-8 feet. Stated differently, three different grand piano dolly models, respectively covering three different piano length ranges, namely, 5-6 feet, 6-7 feet and 7-8 feet, can be fabricated using only one style of arm for the front pair of arms, one style of hub incorporating identical upper and lower plates, one style of fasteners, and three different styles of rear slotted arms, totaling only six different components.

BRIEF DESCRIPTION OF THE DRAWINGS

These and other features, aspects, and advantages of the present invention will become better understood with regard to the following description, and accompanying drawings wherein.

DETAILED DESCRIPTION OF THE INVENTION

Figure 1:
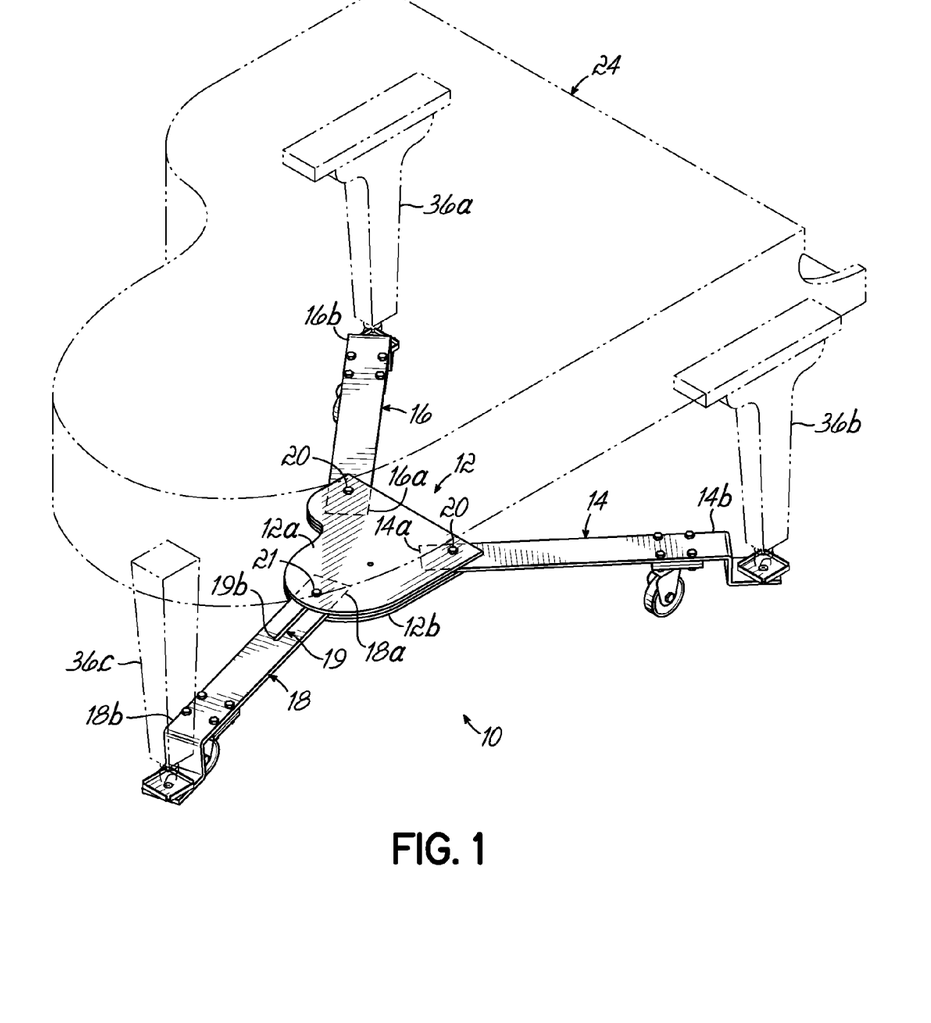
FIG. 1 is a perspective view of a grand piano dolly according to one embodiment of the present invention, with the dolly supporting a grand piano thereon, with the piano shown substantially in phantom.

As shown in FIG. 1, the grand piano dolly 10 includes a central hub 12, preferably comprising vertically spaced upper and lower metal plates 12a and 12b, extending outwardly from which are a first, left, front arm 14, a second, right, front arm 16, and a third, rear arm 18. The arms 14, 16 and 18 are of fixed length, and each arm is selectively angularly adjustable in a horizontal plane relative to the hub 12.

Figure 2:
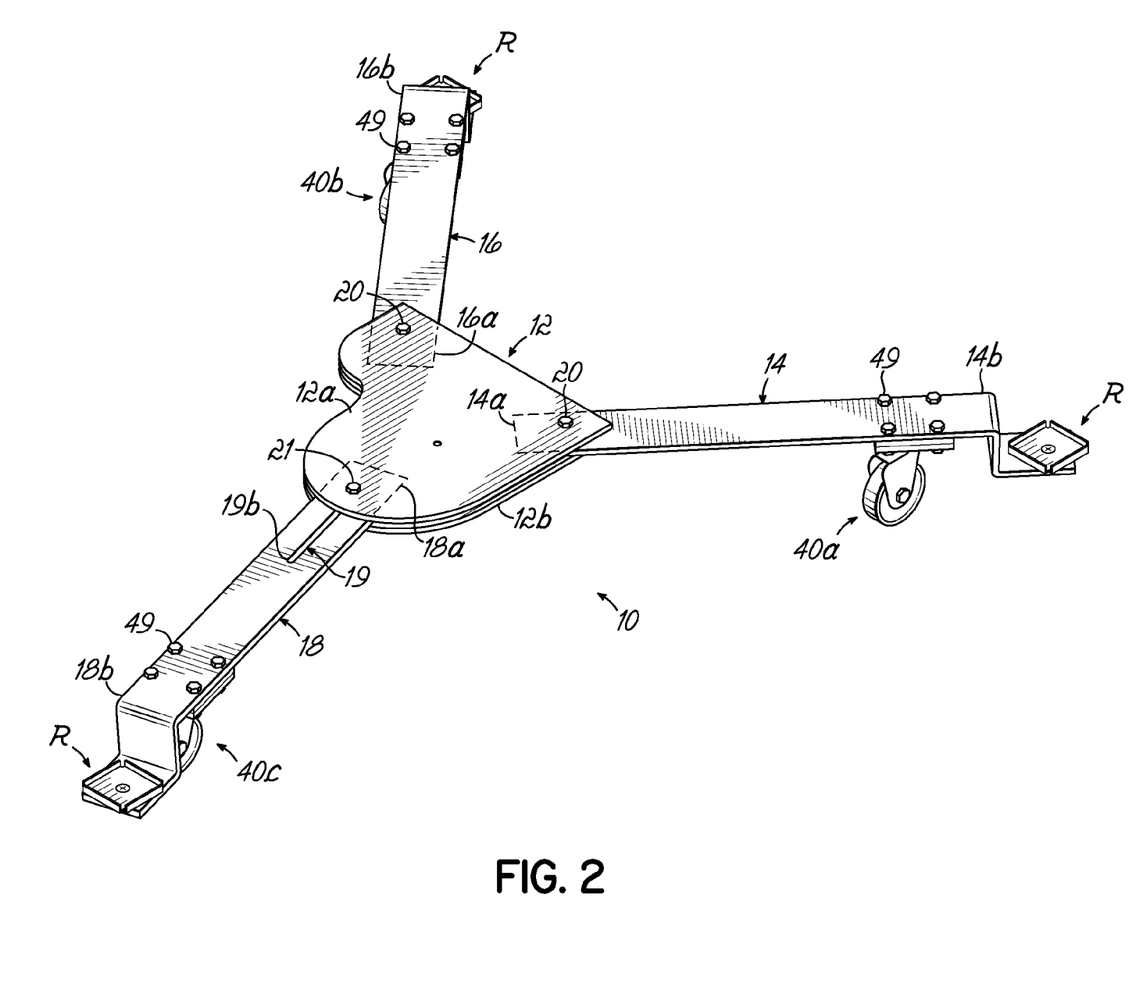
FIG. 2 is a perspective view of the dolly shown in FIG. 1.
Figure 3:
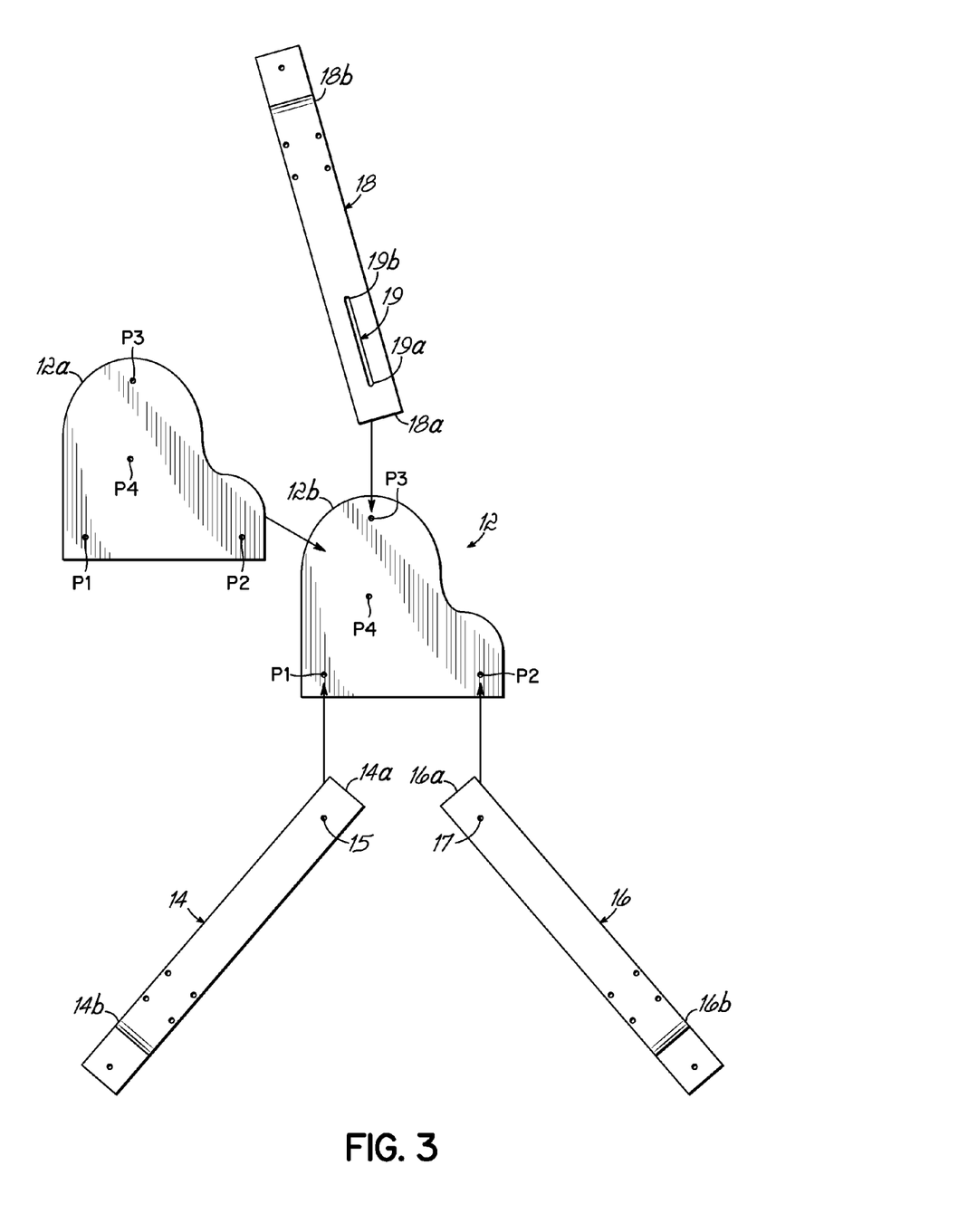
FIG. 3 is an exploded assembly plan view of the dolly shown in FIG. 1.
Figure 7:
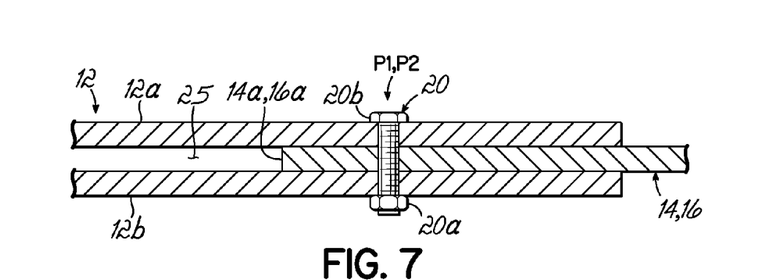
FIG. 7 is a vertical cross-sectional view through a portion of the upper and lower hub plates and the inner end of one of the slotless front arms secured in sandwiched relation therebetween by a threaded fastener passing through aligned holes in the plates and arm, with the fastener tightened to lock the arm at the desired pivot angle.

As shown in FIGS. 1-3, the front left arm 14 has inner and outer ends 14a and 14b, respectively, and is selectively angularly adjustably pivotally connected, at a fixed pivot location 15 thereon, to the hub 12 at a first fixed pivot connection point P1 on the hub, preferably by an adjustable and removable fastener 20. As best shown in FIG. 7, the fastener 20 consists of a threaded nut 20a and bolt 20b, with the bolt extending through aligned through holes (not numbered) in the upper and lower hub plates 12a and 12b which are also both in alignment with a through bore (not numbered) at fixed pivot point location 15 (FIG. 3) adjacent the inner end 14a of the arm 14. By loosening the nut 20a, the left front arm 14 can be selectively angularly positioned to locate its outer arm end 14b in proper position to underlie the lower end of the left piano leg 36b. When the nut 20b is tightened, the upper 12a and lower 12b hub plates are urged toward each other to clamp the end 14a of arm 14 sandwiched there between in the desired angular position.

As shown in FIGS. 1-3, the front right arm 16 has inner and outer ends 16a and 16b, respectively, and is selectively angularly adjustably pivotally connected, at a fixed pivot location 17 thereon, to the hub 12 at a second fixed pivot connection point P2 on the hub, preferably by an adjustable and removable threaded fastener 20. As best shown in FIG. 7, the fastener 20 consists of a threaded nut 20a and bolt 20b, with the bolt extending through aligned holes (not numbered) in the upper and lower hub plates 12a and 12b, which aligned holes are also both in alignment with a through bore (not numbered) at fixed pivot location 17 (FIG. 3) adjacent the inner end 16a of the arm 16. By loosening the nut, 20a, respectively, the right front arm 16 can be selectively angularly positioned to locate its outer end 16b in proper position to underlie the lower end of right piano leg 36a, and thereafter locked in position, as described in the preceding paragraph in connection with arm 14, by tightening the nut.

In practice, only after both arms 14 and 16 have been properly positioned to underlie the lower ends of the left and right piano legs 36b and 36a, are the threaded fasteners 20 associated with the hub 12 at pivot points P1 and P2 tightened to securely lock the front arms in the desired angular positions relative to the hub.

With reference to FIGS. 1-3, the rear arm 18, also of fixed length, includes an inner end 18a and an outer end 18b. The rear arm 18 is provided with a longitudinally extending through slot 19 located intermediate the inner end 18a and outer end 18b thereof. The inner slot end 19a and outer slot end 19b are spaced inwardly from the inner and outer ends 18a and 18b, respectively, of rear arm 18. In a preferred embodiment, the slot 19 is approximately eight inches in length with its inner slot end 19a located three inches from the inner end 18a of arm 18. In use, the rear arm 18 is pivotally connected, at a selectively variable position along the slot 19, to the hub 12 at a third pivot connection point P3 on the hub 12, which is spaced rearward from the first and second fixed pivot connection points P1 and P2, to selectively vary the distance between the outer end 18b of arm 18 and the selectively variable pivot position along the slot, which in turn permits selective variation of the distance the outer end 18b of the rear arm 18 extends rearward outwardly beyond the hub 12, to accommodate mounting pianos having differing distances between the lower end of the rear piano leg 36c and the lower end of front piano leg 36b closest thereto of a grand piano to be placed on the dolly 10.

Figure 8:
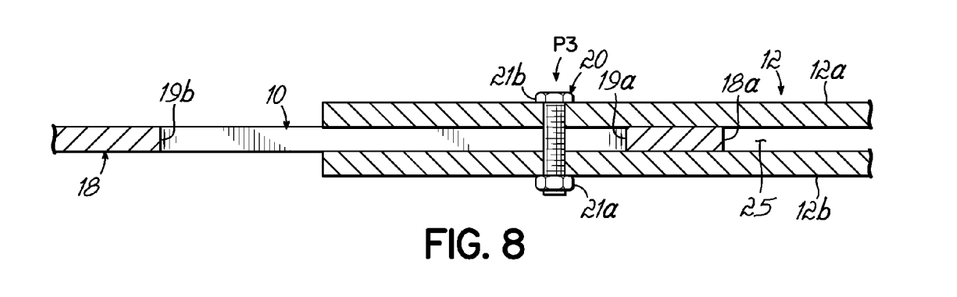
FIG. 8 is a vertical cross-sectional view through a portion of the upper and lower hub plates and the inner end of the slotted rear arm secured in sandwiched relation there between by a threaded fastener, which has been tightened, extending through aligned holes in the upper and lower plates and through the rear arm slot at a selected variable position along the slot length to locate the outer end of the rear arm a selected variable distance outwardly beyond the hub.

The pivotal connection of the rear arm 18 at point P3 on the hub 12 at a selectively variable location along slot 19, is, in a preferred embodiment, effectively accomplished as best shown in FIG. 8. More particularly, aligned through holes (not numbered) are provided in the upper and lower hub plates 12a and 12b at hub pivot point P3. The slot 19 of rear arm 18 is positioned in the space 25 between the hub plates 12a and 12b with the slot 19 aligned with the aligned through holes at pivot point P3 in the upper and lower hub plates 12a and 12b. A removable and adjustable fastener 21, preferably a nut 21a and bolt 21b, is used to effect the pivotal connection. The bolt 21b extends through the aligned upper and lower holes in upper and lower hub plates 12a and 12b at hub pivot point P3, as well as through the slot 19. The rear arm 18 is selectively angularly adjustable in a horizontal plane relative to the hub 12, as well as longitudinally adjustably positionable relative to the hub by moving the rear arm in or out to effectively locate the fastener 21 at different relative selectively variable positions along the length of the slot. When the rear arm 18 has been properly positioned both angularly and longitudinally relative to the hub 12 to locate its outer end 18b in underlying relation to the lower end of the rear piano leg 36c of a piano 24 to be positioned on the dolly, the fastener 21 is tightened to lock the rear arm 18 in the desired position, both angularly and longitudinally, relative to the hub.

The fasteners 20 and 21 also permit convenient assembly of the arms 14, 16, 18 to the hub plates 12a and 12b at the factory prior to shipping, in addition to convenient set-up of the dolly when a grand piano 24, shown schematically in FIG. 1, is to be mounted on the dolly 10.

Figure 6:
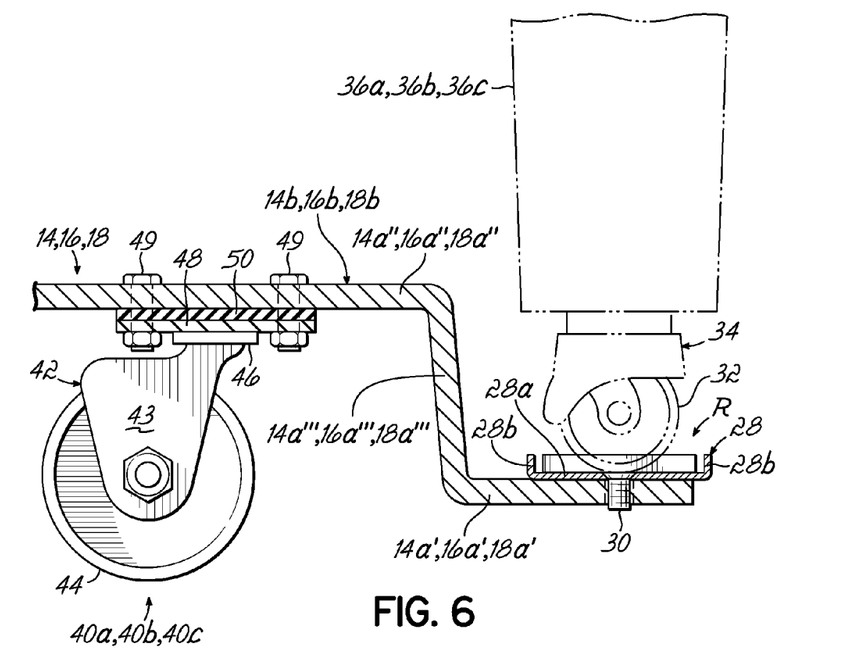
FIG. 6 is a partial vertical cross-sectional view through the Z-shaped outer end section of an arm showing the relationship of a piano leg with its caster located on a receptacle mounted to the upper surface of the outer lower portion of the Z-shaped outer arm end section, and the manner in which a roller assembly in the form of a caster, is mounted to the lower surface of the inner/upper portion of the Z-shaped outer arm end section.

With reference to FIG. 6, the outer ends 14b, 16b and 18b of arms 14, 16, and 18, respectively, preferably are each Z-shaped when viewed in side elevation, as best shown in FIG. 6. The outer ends 14b, 16b and 18b include outer end portions 14b', 16b' and 18b', respectively, and inner end portions 14b'', 16b'' and 18b'', respectively, with the outer end portions being lower than the inner end portions. The inner end portions and outer end portions are integrally connected by intermediate vertical sections 14a''', 16a''' and 18a''', respectively.

Located at each of the outer end portions 14a', 16a' and 18a' of the outer arm ends 14b, 16b and 18b is a receptacle R, preferably in the form of a cup 28 having a flat bottom 28a and four integral upwardly extending sides 28b, which is mounted to the upper surface of its respective outer end portion by a threaded fastener 30 which passes through a central hole in the cup bottom surface into a threaded hole. Each of the receptacles R is designed to receive the lower extremity of a different one of the piano legs, such as the wheel 32 of a caster assembly 34 mounted at the lower ends of the downwardly extending piano legs 36a, 36b and 36c. The receptacle R could take many forms and, for example, could be a cavity formed in the upper surface of the outer end portions 14a', 16a', 18a', or an upwardly extending collar anchored to the upper surface thereof in any suitable manner, such as by welding. Preferably the cups 28 are rotatable about a vertical axis passing through the screw 30 such that the four sides 28b of the cup can be aligned with the four vertical sides of a piano leg having a rectangular horizontal cross-section.

As shown in FIG. 6, located inwardly on inner end portions 14a'', 16a'' and 18a'' of the outer arm ends 14b, 16b and 18b of arms 14, 16 and 18, respectively, are roller assemblies 40a, 40b and 40c, respectively, which are mounted to the lower surface of inner end portions 14a'', 16a'' and 18a'', respectively. The roller assemblies 40a, 40b and 40c, which can be of the same construction, preferably are pivotal casters having a yoke 42 with downwardly extending parallel arms 43,43 (only one being shown) between which a wheel 44 is rotatably mounted for rotation about a horizontal axis as viewed in FIG. 6. The upper end 46 of the yoke 42 is mounted to a plate 48 with respect to which it is rotatable about a vertical axis. The plate 48 is mounted, for example, with respect to inner end portion 14a' of outer end 14b of arm 14 by four fasteners, preferably threaded nut and bolt combinations 49. A shock-absorbing layer 50 is sandwiched between the plate 48 and the inner end portion 14a'', 16a'' and 18a''.

The central hub 12, upper plate 12a and lower plates 12b, in a preferred embodiment, are shaped, as viewed in plan, in the form of a miniature grand piano, as clearly shown in FIG. 1-5.

Figure 9:
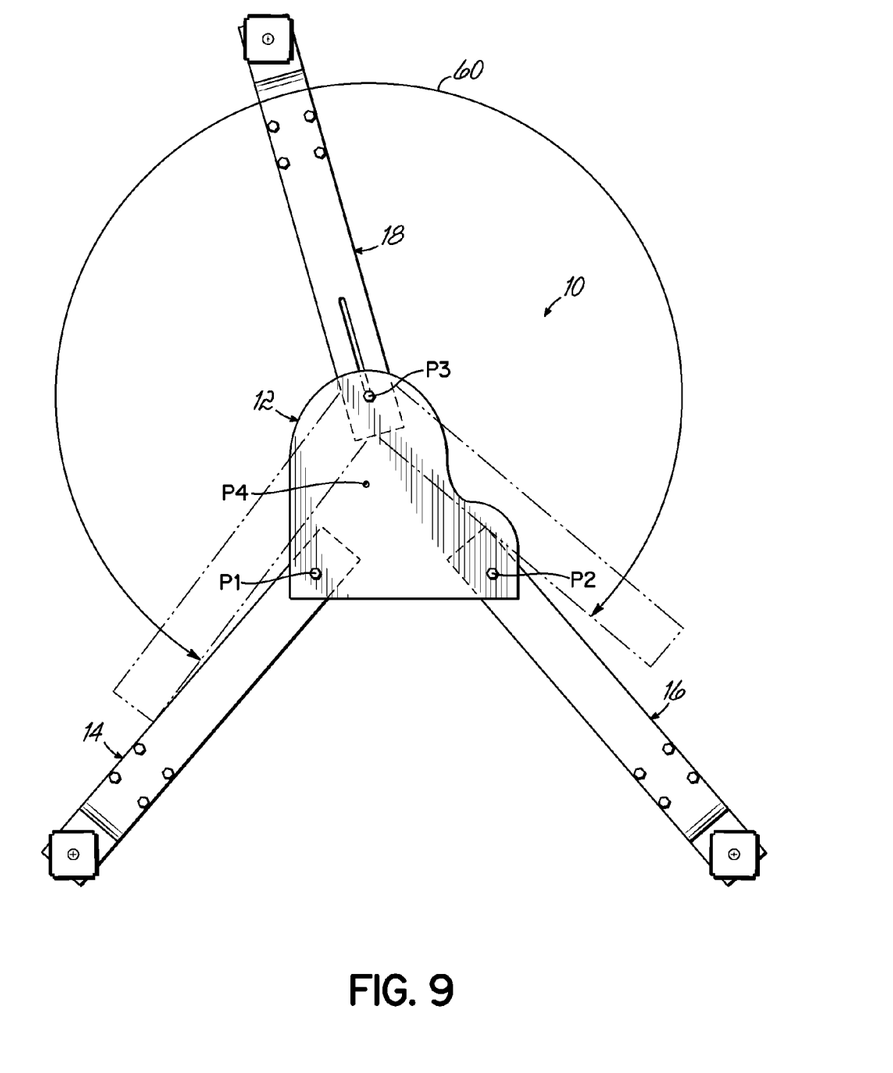
FIG. 9 is a schematic top plan view of the dolly with the rear slotted arm pivotally connected at its inner slot end to the hub at the third outer hub pivot connection point P3, depicting the radial location and range of arcuate motion of the end of the rear arm when the rear arm is in its fully extended position.
Figure 10:
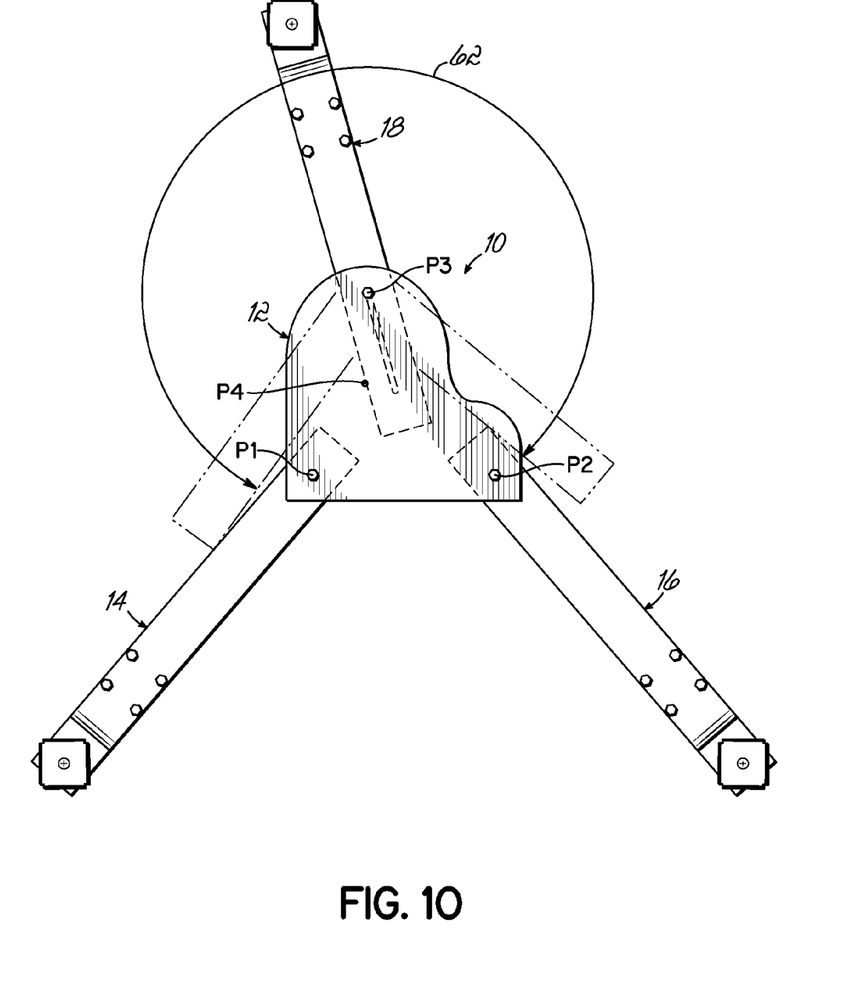
FIG. 10 is a schematic top plan view of the dolly with the rear slotted arm pivotally connected at its outer slot end to the hub at the third outer hub pivot connection point P3, depicting the radial location and range of arcuate motion of the end of the rear arm when the rear arm is in its fully retracted position.
Figure 11:
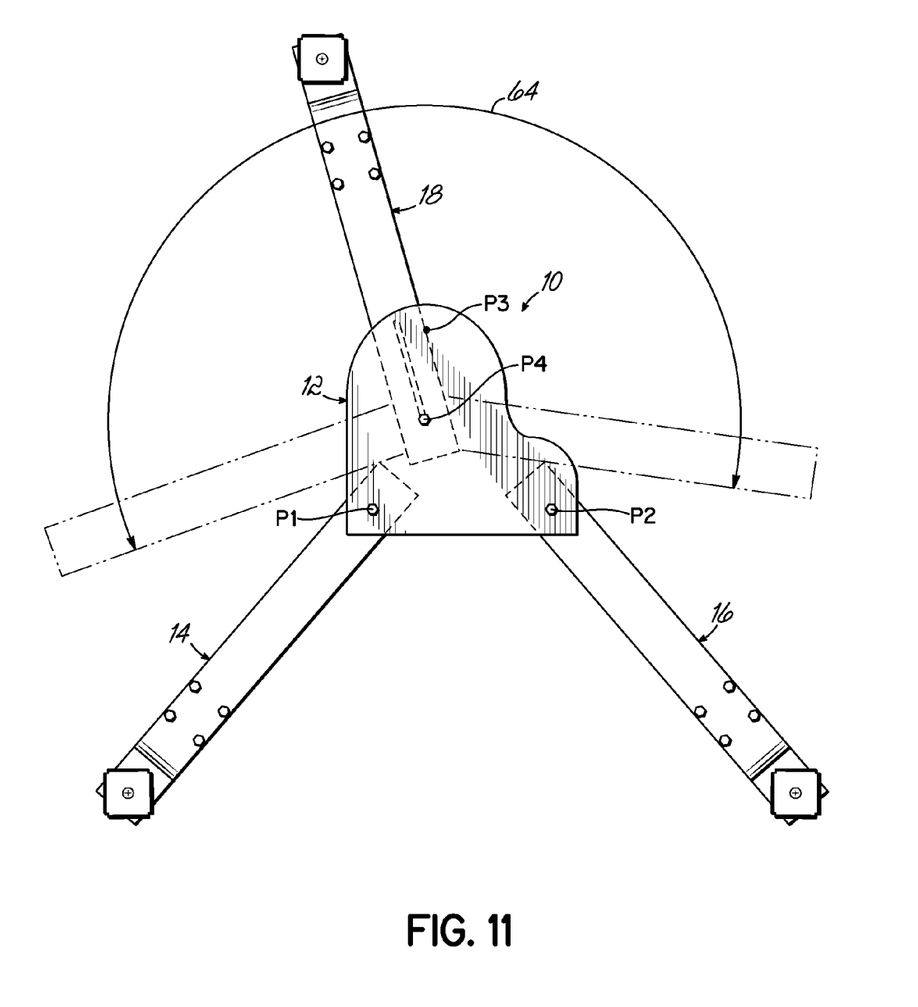
FIG. 11 is a schematic top plan view of the dolly with the rear slotted arm pivotally connected at its inner slot end to the alternative inner fourth hub pivot connection point P4, depicting the radial location and range of arcuate motion of the end of the rear arm when the arm is in its fully extended position.
Figure 12:
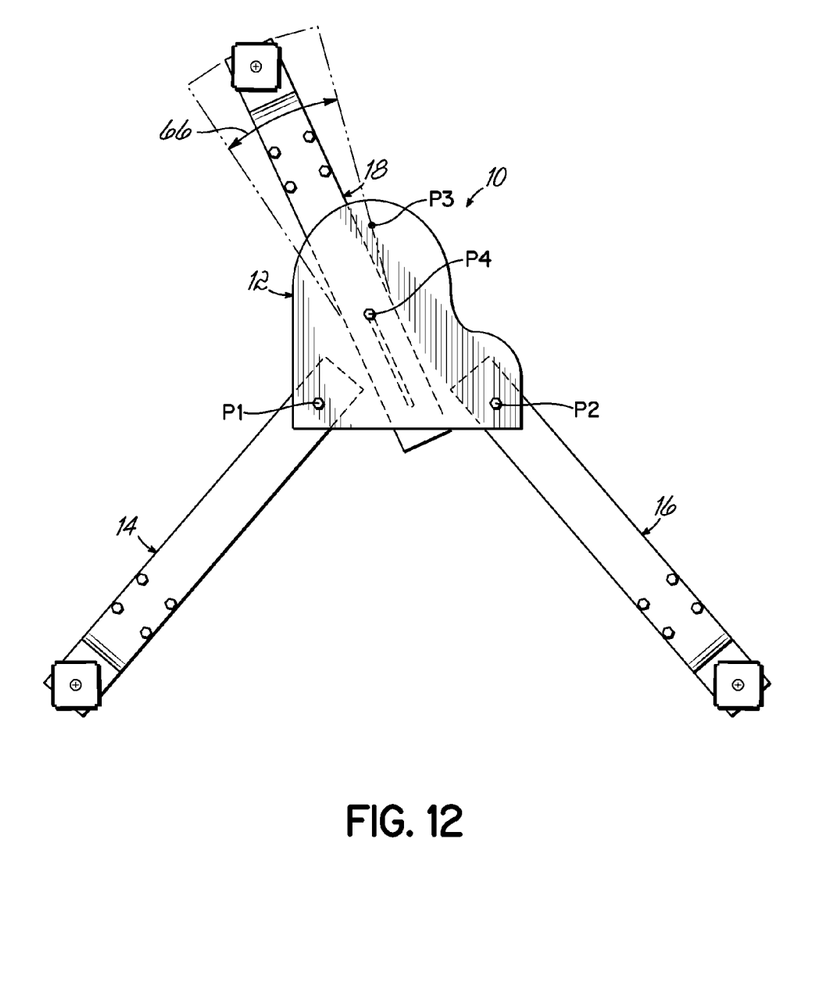
FIG. 12 is a schematic top plan view of the dolly with the rear slotted arm pivotally connected at its outer slot end to the alternative inner fourth hub pivot connection point P4, depicting the radial location and range of arcuate motion of the end of the rear arm when the rear arm is in its fully retracted position.

As noted previously, the rear arm 18 can be pivotally mounted to the hub 12 at point P3 in its fully extended position as shown in solid lines in FIG. 9 wherein the fastener 21 (FIG. 8) is adjacent the inner end 19a of slot 19; or at its fully inward travel position wherein the fastener 21 is adjacent the slot end 19b as shown in FIG. 10; or to any intermediate inward or outward position relative to fastener 21 allowed by the slot. In this manner, the dolly 10 can accommodate piano lengths varying over a predetermined range.

Figure 4:
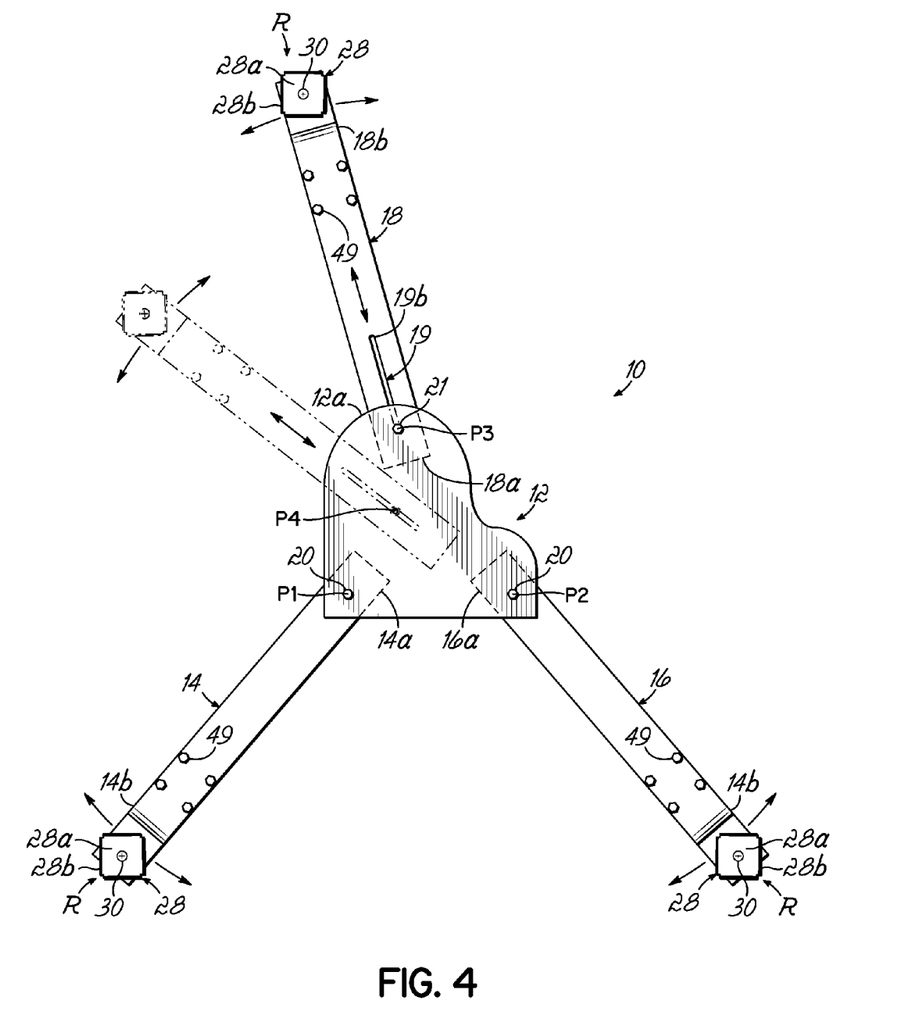
FIG. 4 is a top plan view of the dolly shown in FIG. 1, further illustrating how angular adjustments of all arms, and length adjustments of the rear arm, can be made to the dolly, as well as including an alternative pivot connection point on the hub for the longitudinally slotted rear arm, which is shown in phantom pivotally connected thereto at an intermediate point along the length of the slot.

Alternatively, as shown in phantom in FIG. 4, the rear arm 18 may be pivotally connected to hub 12 at a fourth hub pivot position P4, whereat it can be selectively variably angularly oriented relative to the hub, as well as selectively variably positioned inwardly and outwardly relative to the hub to selectively locate the slot 19 such that the fastener 21 at pivot position P4 is located at different positions along the length of slot 19, thereby varying the distance between the outer end 18b of the arm 18 and the peripheral edge of the hub 12, to accommodate a piano having a range of lengths less than the range of lengths possible when the rear arm 18 is pivotally mounted to the hub 12 at the outer hub pivot point P3.

The angular range of pivotal motion of the rear arm 18 is limited by mechanical interference between the inner end 18a of the rear arm and the inner ends 14a and 16a of the front arms 14 and 16, respectively, as will be apparent from FIG. 4. The permissible range of angular motion of the rear arm 18 is at a maximum when the rear arm is pivotally connected to the hub 12 at hub pivot point P3, and decreases when the rear arm is pivotally connected to the hub at the alternative hub pivot point P4.

Figure 5:
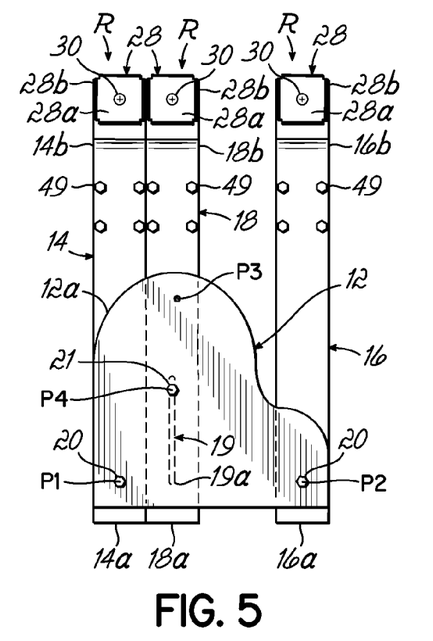
FIG. 5 is a top plan view of the dolly shown in FIG. 1 wherein all three arms pivotally connected to the hub plate are oriented rearward in parallel, with the rear arm pivotally connected at the alternative connection point P4 and in its fully retracted position, to maximize compactness for shipping.

As shown in FIG. 5, the arms 14, 16 and 18 of the dolly 10 of this invention can be oriented for shipment from the factory to a customer in its fully assembled yet compact, condition by pivotally connecting rear arm 18 at the alternative hub pivot point P4 and angling all three of the arms 14, 16 and 18 rearward relative to the hub 12 such that all arms extend rearward and parallel to each other, with rear arm in a partially retracted position, resulting in the inner and outer ends of all of the arms being in line with each other. In the foregoing configuration, the dolly 10 occupies minimum volume, that is, exhibits maximum compactness, thereby minimizing cartoning and shipping costs. A slightly longer arm orientation for shipment results if the rear arm 18 is pivotally connected to the hub at hub pivot point P3.

As those skilled in the art will recognize, fasteners 20 and 21 can be of a type other than threaded fasteners consisting of a bolt and nut. For example, there are various forms of cam fasteners (not shown) comprising a stem with an enlarged head at one end and a pivotal lever-operated cam at the other end having a curved cam surface adapted to contact the outer surface of one of the hub plates, the other outer hub plate surface being in contact with the enlarged stem head. Pivoting of the cam lever in one direction urges the hub plates toward each other, clamping the inner end of its associated arm between the plates within which it is sandwiched. Reversing the direction of pivotal movement of the cam lever allows the hub plates to separate, permitting the rear arm 18 to move angularly as well as linearly along its length.

Figure 13:
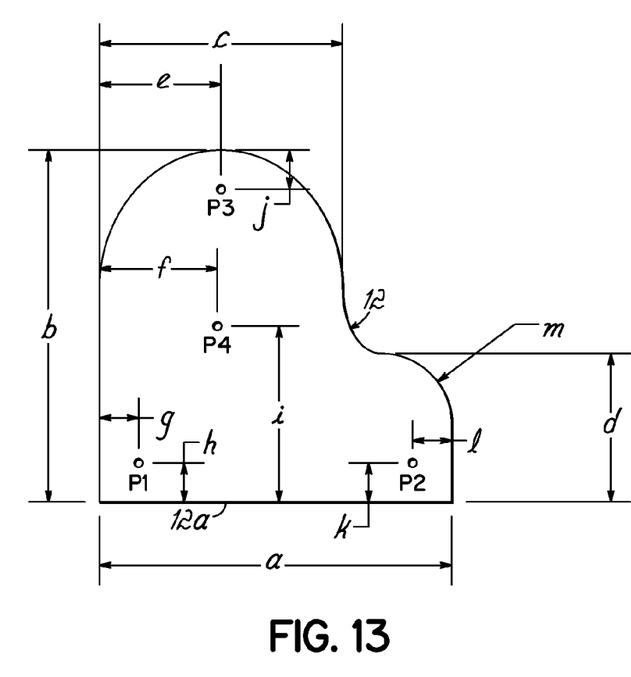
FIG. 13 is a top plan view of a grand piano shaped hub plate dimensioned in accordance with one preferred embodiment, depicting the location of two front pivot points P1 and P2 on the hub, whereas the front pair of identical arms are respectively pivotally connected to the hub, and the locations of two different alternative pivot points P3 and P4 whereat the rear arm can alternatively be pivotally connected to the hub.

In one preferred dolly embodiment, designed to accommodate pianos having a length between five feet and six feet, the grand piano-shaped hub plates 12a and 12b are identical to each other, fabricated of hot rolled steel having a uniform thickness of 0.25 inch, and have the following dimensions a-m as shown in FIG. 13 when viewed in plan:

| | |
|---|---|
| a: | 18 inches |
| b: | 18 inches |
| c: | 12¹³⁄₃₂ inches |
| d: | 7¹⁹⁄₃₂ inches |
| e: | 6⁷⁄₃₂ inches |
| f: | 6¹⁄₃₂ inches |

-continued

| | |
|---|---|
| g: | 2 inches |
| h: | 2 inches |
| i: | 9 inches |
| j: | 2 inches |
| k: | 2 inches |
| l: | 2 inches |
| m: | 3⅝ inch radius |

In the foregoing preferred embodiment, the front arms 14 and 16 are identical to each other, fabricated of hot rolled steel having a uniform thickness of 0.500 inch, a length of 30 inches and a width of 4 inches. The rear arm 18 of this preferred embodiment is also 30 inches in length, fabricated of hot rolled steel having a thickness of 0.500 inch, and a 4 inch width. The rear arm 18 is fabricated of the same material as the front arms 14 and 16, and has the same length, width and thickness as the front arms, and differs from the front arms 14 and 16 only by inclusion of a through slot 19 having a length of 8 inches and a width of 0.500 inch, with the inner end 19a of the slot being spaced 3 inches from the inner end 18a of the arm.

The dolly constructed with the above dimensions will conveniently locate the hub 12 rearward of the back of the pedal lyre, which in a typical piano is in the approximate range of 16-18 inches rearward of the front edge of the keyboard. Additionally, the front arms 14 and 16 will be at the same acute angle with respect to an imaginary line connecting the receptacles R in which the lower ends of the front piano legs are positioned, and the front straight edge of the hub plate 12 will be oriented parallel to the front edge of the keyboard which in a typical case is approximately 48+/− one inch wide.

To accommodate grand pianos on the dolly of this invention having lengths in the six foot to seven foot range, and in the seven foot to eight foot range, rear arms 18 having lengths of 42 inches and 52 inches, respectively, are substituted for the 30 inch long rear arm 18 of the preferred embodiment described in the preceding paragraph. The material and other dimensions of the foregoing two substitute rear arms are the same as that of the rear arm described in the preceding paragraph.

Minimization of the number of component parts that must be inventoried by the manufacturer and the attendant component storage space needed, assuming three different dolly models are desired using alternative rear arm lengths of 30 inches, 42 inches and 52 inches, can be accomplished by using identically constructed front arms 14 and 16 for all three models, identical hubs 12 in which the upper and lower hub plates 12a and 12b are identical, and identical fasteners for the three arms of each model, resulting in a total of six different components, namely, one hub plate style, one arm style for both of the front arms, one fastener style, and three rear slotted arm styles of differing lengths. Using only the foregoing six components, three different dollies can be assembled, each covering a different piano length ranges, namely, 5-6 feet, 6-7 feet and 7-8 feet, which collectively accommodate piano lengths over an extended piano length range from five feet to eight feet. This represents an enormous savings to the manufacturer in terms of component inventory requirements and the attendant component storage needed.

Dollies constructed in accordance with the preferred embodiment are readily and easily configured by the user to accommodate a piano of a given leg configuration and length. The user will immediately recognize that the grand piano shaped dolly hub 12 should be oriented relative to the grand piano to mimic the shape of the grand piano, and further that the front dolly arms 14 and 16 should be positioned to receive the front piano legs and that the rear dolly arm 18 should be positioned to receive the rear piano leg.

Additionally, with left and right front arms 14 and 16 of equal length and the first and second pivot connection points P1 and P2 on the hub 12, to which the inner arm ends 14a and 16a are respectively connected, are selected to be symmetrically located adjacent the left and right front corners of the hub, when the left and right front piano legs 36b and 36a are supported by the left and right front arms, the front keyboard edge of the grand piano shaped hub is oriented parallel to the front edge of the piano keyboard.

While the foregoing description has set forth the preferred embodiments of the present invention in particular detail, it must be understood that numerous modifications, substitutions and changes can be undertaken without departing from the true spirit and scope of the present invention as defined by the ensuing claims. The invention is therefore not limited to specific embodiments as described, but is only limited as defined by the following claims.

What is claimed is:

1. A dolly for moving a grand piano having first and second downwardly extending front legs, the lower ends of which are horizontally spaced apart, one downwardly extending rear leg, the lower end of which is horizontally spaced from the lower ends of the front legs, and a downwardly extending pedal lyre the lower end of which has forwardly extending pedals, said dolly comprising:
    a central pivot hub,
    a first elongated fixed length arm having an inner end and an outer end, said inner end thereof being pivotally connected, at a fixed pivot location thereon, to said hub at a first fixed pivot connection point on said hub, the aforesaid pivotal connection between said first arm and said hub constituting the sole pivotal connection therebetween,
    a second elongated fixed length arm having an inner end and an outer end, said inner end thereof being pivotally connected, at a fixed pivot location thereon, to said hub at a second fixed pivot connection point on said hub which is spaced from said first pivot connection point on said hub, the aforesaid pivotal connection between said second arm and said hub constituting the sole pivotal connection therebetween,
    a third elongated fixed length arm having an inner end, an outer end, and a longitudinally extending through slot having inner and outer slot ends, said slot being located intermediate said inner and outer ends of said third arm, with said inner and outer slot ends being spaced inwardly from said inner and outer arm ends, respectively,
    a receptacle located on each of said first, second, and third arms for receiving the lower ends of said first front leg, said second front leg, and said rear leg, respectively, of the grand piano
    said third arm being pivotally connected, at a selectively variable position along said slot, to said hub at a third fixed pivot connection point on said hub which is spaced from said first and second fixed pivot connection points, to selectively vary the distance between the outer end of said third arm and said selectively variable position along said slot, to thereby selectively vary the distance the outer end of the third arm extends outwardly beyond said hub, to accommodate mounting pianos having differing distances between the lower end of the rear leg and the lower end of the front leg closest thereto, and
    first, second and third roller assemblies respectively mounted to said first, second and third arms operatively effective to facilitate horizontally moving said grand piano positioned on said dolly to selectively variable locations of a surface.

2. The dolly of claim 1 wherein the first elongated fixed length arm and the second elongated fixed length arm are substantially equal in length, said length being sufficiently long to position said hub rearward of the lower end of the pedal lyre of the grand piano.

3. The dolly of claim 2 wherein the length of said third elongated fixed length arm is substantially equal to the length of the said first and second elongated fixed length arms.

4. The dolly of claim 1 wherein:
said hub further comprises a fourth pivot connection point located inwardly of said third pivot connection point, and
said third arm being selectively alternatively pivotally connected to said hub at one or the other of said third and fourth pivot connection points on said hub to provide increased selective variation of the distance the outer end of the third arm extends outwardly beyond said hub, to thereby accommodate mounting grand pianos having a greater range of distances between the lower end of the rear leg and the lower end of the front leg closest thereto.

5. The dolly of claim 1 wherein:
the first, second and third arms are each bars having a substantially rectangular transverse cross-section, and having a thickness measured between the upper and lower flat surfaces thereof which is substantially uniform along the length thereof, and
said mounting hub includes upper and lower vertically superimposed flat plates spaced apart a distance to accommodate positioning the inner ends of said first, second and third arms in sandwiched relationship between the upper and lower plates for pivotal movement therebetween in a plane parallel to the plates.

6. The dolly of claim 1 wherein:
said hub includes upper and lower vertically superimposed plates spaced apart a distance to accommodate positioning the inner ends of said first, second and third arms in sandwiched relationship between the upper and lower plates for pivotal movement therebetween in a plane parallel to the plates,
at least one of the upper plate and lower plate is provided with first, second and third through holes at said first, second and third pivot connection points, respectively,
the inner ends of the first and second arms are provided with first and second through bores, respectively,
first and second fasteners extending from the other of the upper plate and lower plate through the first and second bores, respectively, of the inner ends of the first and second arms, respectively, and through and outwardly of the first and second through holes of said one plate at said first and second hub pivot connection points, and
a third fastener extending from said other of the upper plate and lower plate through said slot in said third arm, and through and outwardly of said third through hole of said one plate.

7. The dolly of claim 1 wherein:
said central pivot hub includes upper and lower vertically superimposed plates spaced apart a distance to accommodate positioning the inner ends of said first, second and third arms in sandwiched relationship between the upper and lower plates for pivotal movement therebetween in a plane parallel to the plates,
the upper plate and lower plate are each provided with first, second and third through holes at said first, second and third pivot connection points, respectively,
the inner ends of the first and second arms are provided with first and second through bores, respectively, and
first, second and third fasteners extending through the first bore, second bore, and through slot of said first arm, second arm, and third arm, respectively, said first, second and third fasteners also extending through the first, second and third through holes, respectively of said upper and lower plates at the first, second and third pivot connection points, respectively, to facilitate selective establishment of said pivotal connections between said upper and lower plates, and the inner ends of said first, second and third arms sandwiched there between.

8. The grand piano dolly of claim 1 wherein:
the central hub comprises a generally flat upper plate having a perimeter edge shape to visually simulate a miniature grand piano as viewed in plan, said plate having a substantially straight front edge simulating the keyboard edge of a grand piano, and left side, rear and right side edges simulating the overall configuration of the left side, rear and right side edges of a grand piano,
the first and second fixed pivot connection points are located proximate a left front corner of the plate defined by the intersection of the left end of the front edge and the front end of the left side of the plate, and right front corner of the plate defined by the intersection of the right end the front edge and the front end of the right side of the plate, respectively, and
the third pivot connection point is located proximate the rear of the plate.

9. The grand piano dolly of claim 8 wherein:
said upper plate includes a fourth hub pivot connection point located inwardly of said third pivot connection point, and
said third arm being selectively alternatively pivotally connected to said plate at one or the other of said third and fourth hub pivot connection points of said plate to provide increased selective variation of the distance the outer end of the third arm extends outwardly beyond said plate, to thereby accommodate mounting grand pianos having a greater range of distances between the lower end of the rear piano leg and the lower end of the front piano leg closest thereto.

10. The dolly of claim 1 wherein said first arm, second arm, and third arm extend in the same direction from their respective hub pivot connection points and are disposed parallel to each other to minimize the volume of the dolly for at least one of storage and shipping.

11. The grand piano dolly of claim 8 wherein:
the first and second arms are of equal length, and
the first and second pivot connection points are symmetrically located with respect to the left front corner and the right front corner of the flat upper hub plate,
whereby when the left and right piano legs of the grand piano are placed on the first and second arms, the piano keyboard will be disposed parallel to the straight front edge of the plate.

* * * * *

UNITED STATES PATENT AND TRADEMARK OFFICE
CERTIFICATE OF CORRECTION

| | | |
|---|---|---|
| PATENT NO. | : 7,988,161 B2 | Page 1 of 1 |
| APPLICATION NO. | : 12/353448 | |
| DATED | : August 2, 2011 | |
| INVENTOR(S) | : Gary R. Kilday | |

It is certified that error appears in the above-identified patent and that said Letters Patent is hereby corrected as shown below:

Column 10, line 54 CLAIM 1 reads "...of the grand piano" and should read -- ...of the grand piano, --

Column 23, lines 30-21 CLAIM 8 reads "...intersection of the right end the front edge and the front end of the right side of the plate,..." and should read -- "...intersection of the right end of the front edge and the front end of the right side of the plate,..." --

Signed and Sealed this
Fifteenth Day of January, 2013

David J. Kappos
*Director of the United States Patent and Trademark Office*